United States Patent
Hottinen et al.

(10) Patent No.: US 8,623,562 B2
(45) Date of Patent: Jan. 7, 2014

(54) METHOD AND ARRANGEMENT TO REDUCE THE CONSUMPTION OF SAFETY GAS IN A FUEL CELL SYSTEM

(75) Inventors: Tero Hottinen, Lohja (FI); Timo Lehtinen, Espoo (FI); Jukka Göös, Helsinki (FI)

(73) Assignee: Convion Oy, Espoo (FI)

( * ) Notice: Subject to any disclaimer, the term of this patent is extended or adjusted under 35 U.S.C. 154(b) by 0 days.

(21) Appl. No.: 12/987,558

(22) Filed: Jan. 10, 2011

(65) Prior Publication Data

US 2011/0123879 A1     May 26, 2011

Related U.S. Application Data

(63) Continuation of application No. PCT/FI2009/050618, filed on Jul. 9, 2009.

(30) Foreign Application Priority Data

Jul. 10, 2008  (FI) .................................... 20085719

(51) Int. Cl.
*H01M 8/06*  (2006.01)

(52) U.S. Cl.
USPC ........... 429/415; 429/408; 429/410; 429/411; 429/427; 429/428; 429/443

(58) Field of Classification Search
USPC ......... 429/408, 410–413, 427–428, 433, 436, 429/443
See application file for complete search history.

(56) References Cited

U.S. PATENT DOCUMENTS

| | | | |
|---|---|---|---|
| 6,835,479 B2 | 12/2004 | Balliet et al. | |
| 2002/0071975 A1* | 6/2002 | Shimazu | 429/17 |
| 2003/0148167 A1 | 8/2003 | Sugawara et al. | |
| 2005/0031917 A1* | 2/2005 | Margiott et al. | 429/17 |
| 2007/0275282 A1 | 11/2007 | Veyo et al. | |

FOREIGN PATENT DOCUMENTS

| | | |
|---|---|---|
| CN | 1864292 A | 11/2006 |
| JP | 11-162492 | 6/1999 |
| JP | 2004-335163 | 11/2004 |
| JP | 2005-531123 | 10/2005 |

(Continued)

OTHER PUBLICATIONS

International Search Report for PCT/FI2009/050618 dated Oct. 30, 2009.

(Continued)

*Primary Examiner* — Patrick Ryan
*Assistant Examiner* — Ben Lewis
(74) *Attorney, Agent, or Firm* — Buchanan Ingersoll & Rooney PC

(57) ABSTRACT

A method and system are disclosed for reducing the consumption of safety gas in a fuel cell system having at least one fuel cell unit whose fuel cells include an anode side and a cathode side, as well as an electrolyte interposed therebetween. A supply is provided for supplying the anode with a safety gas, and an exhaust is provided for exhausting the fuel cell unit of a spent safety gas coming from the anode side. The method can adapt a specific percentage of the spent safety gas flow coming from the anode side of the fuel cells to be re-supplied into the anode side of the fuel cells.

17 Claims, 1 Drawing Sheet

(56) References Cited

FOREIGN PATENT DOCUMENTS

| JP | 2006-164894 | * | 6/2006 | .............. H01M 8/04 |
| JP | 2006-164894 A | | 6/2006 | |
| JP | 2006-209994 | | 8/2006 | |
| JP | 2007-273311 A | | 10/2007 | |
| WO | 9905741 | | 2/1999 | |
| WO | 2008049448 A1 | | 5/2008 | |

OTHER PUBLICATIONS

Finnish Search Report for FI 20085719 dated Mar. 25, 2009.
Search Report dated Nov. 5, 2012, in related CN application, 2 pps.
Extended European Search Report dated Jul. 4, 2013 issued in a corresponding European Patent Application, 7 pps.
Office Action issued in corresponding Japanese Patent Application No. 2011-51787 dated Jul. 9, 2013 with English Translation.

* cited by examiner

METHOD AND ARRANGEMENT TO REDUCE THE CONSUMPTION OF SAFETY GAS IN A FUEL CELL SYSTEM

RELATED APPLICATIONS

This application claims priority as a continuation application under 35 U.S.C. §120 to PCT/FI2009/050618 (WO 2010 004091) which was filed as an International Application on Jul. 9, 2009 designating the U.S., and which claims priority to Finnish Application 20085719 filed in Finland on Jul. 10, 2008. The entire contents of these applications are hereby incorporated by reference in their entireties.

FIELD

A method and fuel cell system to reduce the consumption of safety gas in a fuel cell system are disclosed, wherein the fuel cell system can include at least one fuel cell unit whose fuel cells include an anode side and a cathode side, as well as an electrolyte interposed between the anode side and the cathode side, a supply to the anode side with a safety gas, and an exhaust of spent safety gas coming from the anode side.

BACKGROUND INFORMATION

SOFC type fuel cell systems (solid oxide fuel cell) are known, in which a material component is nickel. Such fuel cell systems can be sensitive to oxidation, resulting in nickel oxide. The oxidation of nickel can occur immediately when the surrounding gas mixture is not exclusively reductive (i.e., if it contains oxygen molecules available for an oxidation reaction). If nickel oxide inadvertently forms in a sufficient amount, the morphology of an anode electrode can change irreversibly. The electrochemical activity of the anode falls considerably, leading, in an exemplary worst case scenario, to a termination of the entire fuel cell operation.

Therefore, specifications of, for example, SOFC systems, in situations other than a normal running condition, include actions be taken in order to prevent such oxidation. An exemplary measure is to supply the anode side with a safety gas which contains reducing components capable of protecting the anode electrodes of a fuel cell from oxidation. In practice, the safety gas is used for bonding all of the free oxygen slipping or striving from the cathode side to the anode side by burning via the safety gas catalytically with the electrode. The reducing gas atmosphere established by a safety gas is used for the anode electrodes of a fuel cell in conditions with no actual fuel being supplied into the fuel cells. Exemplary conditions like that include a start-up and shutdown of the apparatus. The reducing component employed in a safety gas is, for example, hydrogen which uses a catalyst in order to react with oxygen and burn it away.

For reasons of safety, however, the concentration of hydrogen is diluted to a suitable level by an appropriate inert gas such as nitrogen. When the employed safety gas is a hydrogen-containing gas mixture, it would be, just from the aspect of safety, the more beneficial the lower the hydrogen concentration. Namely, the concentration of hydrogen gas is diluted to a level sufficiently low for staying at each temperature below the concentration matching the ignition point of hydrogen gas.

However, the dilute concentration of hydrogen involves a high-volume total flow because the amount of an inert gas, for example nitrogen, used for diluting the hydrogen, respectively increases. On the other hand, in order to limit the total volume of a safety gas, it would be the more beneficial the higher the hydrogen concentration. The use of a higher concentration of hydrogen would enable lessening the demand for nitrogen and further the total amount of safety gas.

In addition, when using such a safety gas in a known manner, the process operating window can become limited to an unnecessarily small size. The concentration of a safety gas should be controlled in such a way that the mixture flowing out of a possible leakage—fuel cells typically leak a certain amount of gases to their vicinity—shall retain its properties below the values matching the auto-ignition point—primarily below a LEL (Lower Explosive Limit), i.e., a lower auto-ignition point. For example, in the case of a hydrogen-nitrogen mixture at room temperature, this represents a hydrogen concentration of about 6%. As temperature rises, this threshold concentration becomes gradually even lower. Thus, the hydrogen concentration has quite strict limits imposed thereupon. Even moderately minor variations for example in hydrogen concentrations bring the parameters of a gas mixture too close to values corresponding to what is in excess of the above-mentioned ignition point. Thus, when using a hydrogen-containing safety gas, the operating parameters of a process, and for example the hydrogen concentration, should be subjected to a precise monitoring regime. This is particularly relevant at higher temperatures. Regarding the ignition of a safety gas, another exemplary aspect is the surrounding ambient temperature such as a space surrounding the fuel cell, into which space the safety gas is possibly able to leak.

After flowing once through a fuel cell, the spent safety gas is expelled from the fuel cell system. The expelled gas, along with the inherent outflow of fuel cells, can be conducted further through an afterburner in which the reductive gases are burned away and the heat is possibly recovered.

Accordingly, because of the operating principle applied in currently available systems, there is a high demand for the large total volume of safety gas. Thus, the use of a safety gas incurs major costs just in the form of raw materials. The high volumetric flow of a safety gas also means that the storage facilities therefor involve substantial space, which further results in additional costs and possible operational restrictions. This pressurized, most often hydrogen-containing safety gas is, for example, stored in compressed gas cylinders. Thus, aboard ships, for example, the amount of safety gas is limited both by a large space for storage and by safety issues.

SUMMARY

A method for reducing the consumption of safety gas in a fuel cell system is disclosed, said fuel cell system having at least one fuel cell unit whose fuel cells include an anode side and a cathode side, and an electrolyte interposed between the anode side and the cathode side, the method comprising: supplying the anode side with a safety gas; exhausting the fuel cell unit of a spent safety gas coming from the anode side; and recirculating a specific percentage of the spent safety gas flow coming from the anode side of the fuel cells into the anode side of the fuel cells, and regulating the unspent safety gas supply flow to the fuel cell unit to achieve on the anode side a desired total amount of a reducing component contained in the safety gas and/or a desired safety gas flow rate.

An arrangement for reducing the consumption of safety gas in a fuel cell system is also disclosed, comprising at least one fuel cell unit whose fuel cells include an anode side and a cathode side, and an electrolyte interposed between the anode side and the cathode side; means for supplying the anode side with a safety gas; means for exhausting the fuel cell unit of a spent safety gas coming from the anode side; and means for recirculating a specific percentage of spent safety gas flow coming from the anode side of the fuel cells into the anode side of the fuel cells, to achieve on the anode side a desired total amount of a reducing component contained in the safety gas and/or a desired safety gas flow rate.

BRIEF DESCRIPTION OF THE DRAWINGS

Exemplary embodiments now be described in more detail with reference to the accompanying drawing, in which.

DETAILED DESCRIPTION

Figure 1:
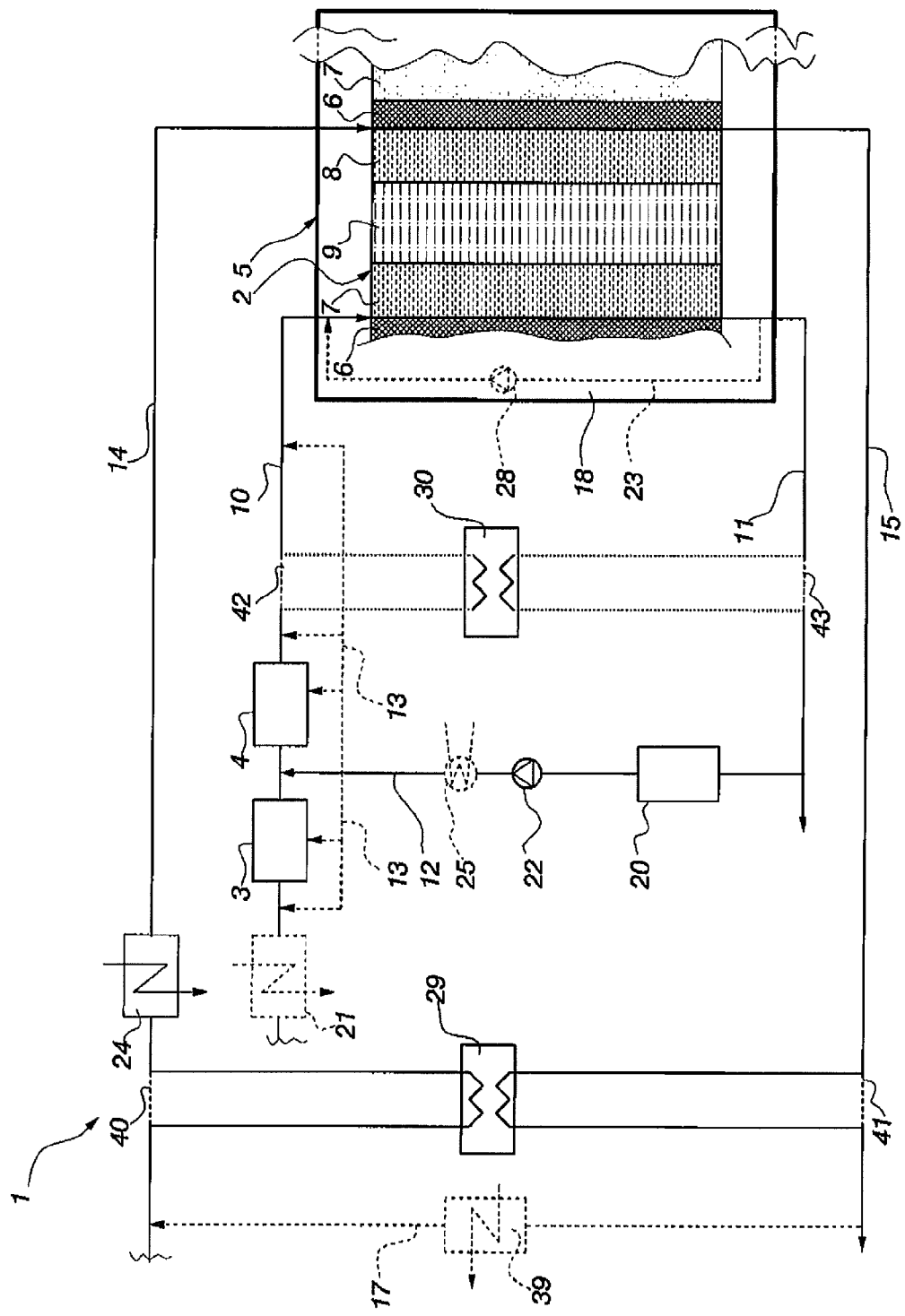
FIG. 1 shows a highly schematic view of an exemplary arrangement, wherein a portion of safety gas returning from an anode side is recirculated for another flow through the anode side.

Exemplary embodiments as disclosed herein recirculate a desired percentage of the stream of safety gas exiting from the anode side of a fuel cell unit on the anode side. Thus, in practice, the specifically adapted and regulated recirculation of safety gas is provided, the intention being that the free unspent hydrogen contained in the safety gas is reused on the anode side of a fuel cell for the reduction of possible free oxygen molecules. A specific-size portion of the total safety gas flow which streams through a fuel cell and exits from the fuel cells is diverted to make another pass across the anode side by separating it from the safety gas flow discharging from the fuel cell and by reuniting it at each appropriate spot with the safety gas supply proceeding to the fuel cells.

Exemplary embodiments can achieve a substantial decrease in overall demand for a safety gas to be supplied into a system and thereby provide savings in raw material costs. The diminished flow of safety gas, such as the outflow of safety gas from the system, as well as the recirculation of safety gas, enable also a decrease in the heat used, especially during a fuel cell system start-up cycle. On the other hand, improved thermal efficiency shortens the system start-up time and thereby improves its functionality.

The term start-up is here used in reference to heating the system to a temperature at which the normal operation of a fuel cell can be activated. As a result of the diminished need for safety gas, it is possible to make do with an amount of stored safety gas lesser than used before in known systems. This is meaningful, particularly at an operating site with limited storage facilities. As a result of the diminished amount of safety gas, and thereby also a diminished amount of highly explosive hydrogen gas, a better-than-before safety level is reached. The ventilation specified is also lesser than before.

FIG. 1 shows an exemplary fuel cell system 1 in a highly schematic view. A fuel cell unit 5, included therein, comprises one or more fuel cell stacks, comprising (e.g., consisting of) successively series-connected fuel cells 2, featuring an anode side 7, a cathode side 8 and an electrolyte 9 provided therebetween, as well as a connecting plate 6, a so-called interconnect, set between individual fuel cells. It is, for example, designed as a sort of bipolar plate (e.g., it is located on the cathode side of one individual fuel cell 2 and on the anode side of another individual fuel cell 2, and functions therebetween both as an electrical conductor between the fuel cells and as a separator wall for gases, blocking the uncontrolled cell-to-cell flow of gases). For purposes of exemplary embodiments disclosed herein, it provides a flow channel system for gases flowing in a fuel cell, both on the anode side and on the cathode side. For the sake of clarity, FIG. 1 only shows a fuel cell stack of the fuel cell unit 5 in the form of a single fuel cell 2.

In this application, the anode side 7 refers generally both to anode electrodes included in the fuel cells 2 of the fuel cell units 5 and, from the perspective of fuel, to components for conducting the fuel within the confines of the fuel cell units 5 to the anodes of actual individual fuel cells and to components for further conducting the gases away from the anodes. Respectively, the cathode side 8 refers to cathodes, as well as to components provided for conducting air to and from the cathodes within the confines of the fuel cell units 5.

In addition, for feeding a safety gas, the anode side 7 is provided with supply means, represented here solely by a supply line 10. There are likewise provided discharge means for draining the fuel cell unit of a safety gas outgoing from the anode side 7. Here, these are only represented by a discharge line 11. Naturally, there may be a plurality of such lines 10, 11. For the sake of clarity, other supply means and discharge means are not depicted. Depicted in FIG. 1 are a prereformer 4 and a desulphurizer 3 or other possible fuel pretreatment devices.

Hence, the safety gas is used on the anode side or fuel side of a fuel cell. In practice, the employed reducing component can be any substance capable of reacting with oxygen, but the one used most commonly is hydrogen gas. For safety reasons, the concentration of highly flammable hydrogen gas should be maintained as low as below an explosion-hazard constituting ignition point in certain segments of the process. This can be accomplished by supplementing the safety gas with an inert gas component, such as, for example, nitrogen or argon. In this example, the safety gas contains hydrogen and nitrogen. The safety gas is conducted into an interior 18 of the fuel cell unit 5 along the fuel cell supply line 10 and further to the anode side 7. The safety gas, having completed its flow through the fuel cell's anode side 7, in turn discharges from the fuel cell unit 5 along the discharge line 11.

The concentration of a reducing component decreases in the fuel cell, because some of the reducing component is consumed in the fuel cell as a result of oxidation. In order to ensure a complete oxidation, it is desirable to make absolutely sure that the amount of reducing hydrogen gas supplied into the fuel cell along with the safety gas exceeds the amount of hydrogen consumed as it flows through the fuel cell. This is why a considerable portion of hydrogen exits from the system in an unspent condition and is delivered as such, along with the rest of the safety gas, out of the fuel cell system and, for example, to an afterburner in which the reducing gases are burned away.

Known arrangements lead to a high consumption of safety gas and inflict thereby, among others, major feedstock costs as well as considerable storage requirement.

According to exemplary embodiments as disclosed herein there is now provided a desired-volume partial recirculation of safety gas through the anode side. For the reason that the gas space surrounding nickel-bearing components can be maintained in a reducing condition and oxidation is precluded, the amount of a reducing substance component supplied into the system should exceed the amount coming out of the system. Because the outflow of safety gas still carries hydrogen $H_2$ present in a useful form, the recirculation of this reducing component can be used for bringing its total amount, in other words, its flow-through from the anode side perspective, to exceed the amount originally supplied into the system. Now, by having a desired portion of the spent safety gas emerging from the fuel cell system diverted back into the supply, the primary feed of safety gas (i.e., the feed of an unspent safety gas) can be diminished by the amount basically matching the free hydrogen $H_2$ contained in the safety gas to be recirculated. This enables mitigating the need for a reducing component $H_2$ to be supplied into an SOFC system and thereby also decreasing the supplied amount. This feature can naturally be applied also with reducing components other than just hydrogen.

Hence, in accordance with exemplary embodiments of this application, the term unspent safety gas is used in reference to a safety gas, comprising (e.g., consisting) at least substantially of a gas mixture which is supplied into the system from outside, from safety gas storage facilities or the like. The safety gas may include gas components, which are still unmixed with each other in supply lines and from which is formed a gas mixture with a desired composition at an appropriate point before being supplied into the fuel cells. On the other hand, the term spent safety gas is used in reference to a safety gas, which has proceeded at least once through the anode side and which is in the process of leaving the anodes. The portion not included either in unspent or spent safety gas (i.e., the portion of safety gas exiting from the system as a result of leakage or runoff), is conducted, as is known through, for example, an afterburner.

It should be noted that of course the safety gas in its stored condition need not necessarily be in the form of a gas. A notable example is a methanol-water mixture, which is then vaporized before its inclusion in the process. In addition, with certain preparatory measures, the safety gas can be produced on site directly from fuel, whereby there is no absolute necessity to have a separate gas storage, except for emergency shutdowns. In that situation, namely, the feed of fuel is totally prohibited by regulation.

In the working example of FIG. 1, there is established a flow communication between the supply line 10 and the discharge line 11 in the form of a line 12. Thereby, a desired portion of the spent safety gas stream exiting from the fuel cell unit 5 is re-directed into the safety gas supply proceeding to the fuel cells. The portion to be re-directed is conducted for example into the line 10, in which flows the fresh unspent safety gas. At this point, the fresh safety gas may still be in the form of separate components in their specific supply lines or in the form of an already blended gas mixture.

In practice, the recirculation of a spent safety gas can be implemented by means of a recirculation device (e.g., by a pump, an ejector or some other flow-promoting device 22). The recirculation of a spent safety gas performed outside the fuel cell unit, and the admixing thereof with the flow of an unspent safety gas, are effected in an exemplary practice upstream of at least possible fuel pretreatment devices (for example, the prereformer 4). The recirculation flow of safety gas can, for example, be conducted to a point upstream also of other pretreatment units, such as for example the fuel desulphurizing unit 3 or a similar type gas scrubbing device. However, the recirculation need not be physically effected just into the supply line 10. Rather, in exemplary embodiments, the safety gas exiting from a fuel cell is brought to travel again through the fuel cell's anode side 7. Other exemplary optional routes for safety gas recirculation are presented later in the specification.

In an exemplary embodiment, the safety gas recirculation disclosed herein is adapted to occur in a substantially continuous action (e.g., the recirculation occurs directly back into the supply side without interim storage). This can represent another advantage from the standpoint of downsizing the space needed for safety gas storage. The percentage of a recirculation flow of safety gas with respect to the total flow thereof is optional basically as desired over the entire range of 0-100%.

Exemplary embodiments can provide, at least momentarily, even a total recirculation, wherein all of the safety gas is in recirculation. The total recirculation, without any addition of safety gas into the recirculation stream, can be sustained basically for as long as permitted by the consumption of hydrogen needed each time for the reduction of oxygen, as well as by the leakage normally present at fuel cell surfaces. After all, in practice, there is always a certain amount of gas flowing outward from fuel cell surfaces. Likewise, safety gas is set to flow out in a small amount over an anode restrictor valve into the outlet pipe. Hence, safety gas or its components are nevertheless added in a certain amount, most conveniently at regular intervals. In exemplary embodiments, a minor flow of safety gas into the system can be sustained all the time.

According to exemplary embodiments, at least more than half of the safety gas is recirculated back into the anode side, most appropriately more than, for example, about 75%. A suitable range of values is each time selectable, depending on the components and limitations of the system. For example, the allowable pressure levels and flow rates, as well as the capacity of recirculation devices, can impose their specific threshold values for the available adjustment window. This can be taken into consideration, among others, in the very regulation of a recirculation rate. The percentage of recirculation is, for example, regulated as an active adjustment depending on other parameters, but it is also possible to use a permanently constant recirculation rate, i.e. the recirculation amount can be constant or the recirculation flow can be constant in volume. Likewise, the regulation can be adapted to only be conducted at certain time gaps.

In exemplary embodiments, the employed principal adjustment parameter is the total amount of a reducing component (for example hydrogen) on the anode side. At the same time, the total amount of safety gas can be adjusted according to the total amount of hydrogen and the recirculation rate of spent safety gas. The higher the percentage of safety gas which is recirculated, the higher is the percentage of the primary supply of safety gas to the supply line which can respectively be totally omitted. The regulation of a safety gas recirculation rate can also be used for applying on its part a desired influence on the concentrations of component substances in a safety gas recirculating in a fuel cell. Thus, in an adjustment regarding the percentage of recirculation, it is possible to take into consideration the changes of and interrelations between concentrations of various components. Exemplary embodiments maintain the amount of free hydrogen $H_2$ below the ignition-point matching concentration at each temperature.

A notable practical example for an exemplary arrangement in the context of an SOFC system is a Wärtsilä fuel cell laboratory prototype (WC20 alpha). The safety gas used therein comprises hydrogen and nitrogen. When the system was operated without a safety gas recirculation arrangement as disclosed herein, the amount of safety gas was approximately 36 m³ (STP) of hydrogen $H_2$ and 19 m³ of nitrogen $N_2$. On the other hand, when the recirculation of safety gas was used in a preset manner, the amount of safety gas could be reduced to 5 m³ in the case of hydrogen and to 37 m³ in the case of nitrogen. In practice, this represents a higher-than-fivefold reduction in the amount of nitrogen and a higher-than-sevenfold reduction in the amount of hydrogen.

The arrangements disclosed herein are not limited to the immediately above described embodiment.

By additionally using, according to alternate embodiments, the active regulation of an unspent safety gas (i.e., its primary flow), the amount of the unspent safety gas can be minimized even more effectively. The fresh safety gas is thereby replenished more precisely than before according to how much of it is consumed on the anode side and/or according to the percentage of recirculation. Likewise, the amount of leaks and safety gas runoff can be observed. As for the regulation setup value in the initial condition, a setup value calculated according to some specific recirculation rate can be applied. With regard to the regulation of safety gas in this exemplary simple embodiment, the recirculation of a safety gas can be carried out in such a way that the safety gas, as the recirculation is increased in line with the primary supply of safety gas, will be diminished without any more interference with the concentrations of primary gas.

On the other hand, the adjustment windows, defined by the exemplary above-mentioned limitations such as acceptable pressure levels and flow rates, as well as by specific threshold values imposed by the capacities of recirculation devices, can be compensated for, as described herein, for example by increasing the hydrogen concentration of a primary safety gas as described hereinafter.

Not being expended for reduction, the inert gas (e.g., nitrogen in this case), will be recirculated, in the process of recirculating a safety gas, both quantitatively and also proportionally more than hydrogen some of which is always consumed while flowing through the anode side. Upon emerging from the anode side, the percentage of nitrogen in the safety gas is higher than what it was upon entering. Thus, in the process of recirculating a safety gas, the concentration of hydrogen has a tendency to decrease while the percentage of nitrogen tends to rise respectively. This can be compensated for by separately diminishing the supply of an inert gas, (e.g., nitrogen). In other words, the recirculation of safety gas as disclosed herein can provide a control method significantly more efficient and cost-friendly than before by regulating separately the percentage of both a reducing component and an inert gas in the primary supply of safety gas into a fuel cell system.

According to this additional exemplary embodiment, the hydrogen, oxidized on the anode side in a fuel cell, is replaced not by a standard safety gas mixture but by a hydrogen mixture concentrated to a desired extent. Because it is just hydrogen which is expended and the consumption of nitrogen is negligible in a fuel cell, the percentage of hydrogen can be emphasized very strongly in the concentration of a replacement safety gas as the safety gas is recirculated. For example, it is viable in practice to use nitrogen and hydrogen or nitrogen and an enriched hydrogen mixture from separate pressure tanks in discrete supply flows, the feed and the mixing ratio thereof being controlled as desired. This enables the simplified achievement of each desired mixture ratio between nitrogen $N_2$ and hydrogen $H_2$ without an unnecessary addition of nitrogen. Hence, a particularly significant reduction in the consumption of nitrogen can be achieved. Also, the concentration of incoming hydrogen can be increased without the concentration leaking from fuel cells exceeding the ignition point. This represents an exemplary benefit of arrangements disclosed herein; e.g., an ability to use clearly higher hydrogen concentration without restrictions imposed by the LEL concentration, and thereby to downsize even further the space used for the storage of safety gas.

In yet another additional exemplary embodiment, in association with the recirculation of safety gas, an adjustment of its temperature and the exploitation of heat bonded to the safety gas for heating other parts of the system are provided, such as for example the prereformer 4 and other fuel side pretreatment devices 3. In FIG. 1, reference numeral 13 is used to designate these exemplary optional further routes, along which a delivery of the recirculable safety gas back into the safety gas supply flow can be achieved. Thus, the recirculated safety gas can also be delivered completely past possible pretreatment devices and the like equipment, especially if the system is simply void of such devices.

It is also possible to provide elements 20 for the treatment of a recirculable safety gas prior to the delivery back into the recirculation. It can be beneficial to separate the hydrogen which has reacted with oxygen (i.e., in practice water vapor), away from the safety gas before a delivery back to the anode. This way, the safety gas can be kept as dry as possible and at the same time the percentage of hydrogen can be increased in the total flow of the recirculable gas. Marked in the FIGURE is also a heating means 25, by which the temperature of a safety gas can be influenced, as desired, to for example, heat the fuel cell unit by means of the safety gas.

According to yet another exemplary embodiment, the recirculation of a safety gas can also be carried out at least partially inside the fuel cell unit 5. A portion of the safety gas is not necessarily expelled at all from the entire unit 5 but, immediately upon exiting the anode side flow channels, is diverted along a line 23 with the assistance of a possible pump 28 or the like booster directly back into the anode side supply flow. This enables, at the same time, enhancing the flow of a safety gas in the actual fuel cell. Likewise, for example, the temperature difference between cathode and anode sides can be made as small as possible.

In still another exemplary embodiment, means are provided for heating and adjusting the temperature of air recirculating on the anode side and for further utilizing its contained heat in the heating of the anode side. The heat contained in warmed-up air proceeds in a fuel cell to the anode side and into a safety gas recirculating therein, which gas further transfers some of the heat to the fuel cell unit and further to other parts of its recirculation loop. Thus, on the anode side, it is possible to completely abandon separate heating devices 21 for heating the elements included in the anode side. Thereby, the temperature can be raised effectively and smoothly in various parts of the fuel cell system by means of heaters used solely on the cathode side. By virtue of the effective heat transfer and gas flow established in fuel cells, the temperature difference between anode and cathode sides is at the same time retained well under control.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for reducing the consumption of safety gas in a fuel cell system, said fuel cell system having at least one fuel cell unit whose fuel cells include an anode side and a cathode side, and an electrolyte interposed between the anode side and the cathode side, the method comprising:
   supplying the anode side with a flow of unspent safety gas;
   exhausting a spent safety gas coming from the anode side supplied with the unspent safety gas;
   recirculating a specific percentage of the exhausted spent safety gas flow coming from the anode side of the fuel cells into the anode side of the fuel cells;
   regulating the unspent safety gas supply flow to the fuel cell unit to achieve on the anode side a desired total amount of a reducing component contained in a combined safety gas flow of unspent and spent safety gases and/or a desired unspent safety gas flow rate; and
   heating the safety gas flowing on the anode side by thermal energy contained in the gas flowing on the cathode side.

2. A method as set forth in claim 1, wherein the specific percentage of the safety gas coming from the anode side of the fuel cell unit is 0-100%.

3. A method as set forth in claim 2, comprising:
uniting the recirculated spent safety gas with said unspent safety gas flow upstream or downstream of a fuel pretreatment device.

4. A method as set forth in claim 3, comprising:
adjusting a temperature of a safety gas to the solid oxide fuel cells for heating and/or cooling the fuel cell unit or an element associated therewith.

5. A method as set forth in claim 4, comprising:
heating the safety gas flowing on the anode side by thermal energy contained in the gas flowing on the cathode side.

6. A method as set forth in claim 1, comprising:
uniting the recirculated spent safety gas with said unspent safety gas flow upstream or downstream of a fuel pretreatment device.

7. A method as set forth in claim 1, comprising:
adjusting a temperature of the safety gas to the fuel cells for heating and/or cooling the fuel cell unit or an element associated therewith.

8. A method as set forth in claim 1, wherein the specific percentage of the safety gas coming from the anode side of the fuel cell unit is more than 50%.

9. A method as set forth in claim 1, wherein the specific percentage of the safety gas coming from the anode side of the fuel cell unit is more than 75%.

10. An arrangement for reducing the consumption of safety gas in a fuel cell system, comprising:
at least one fuel cell unit whose fuel cells include an anode side and a cathode side, and an electrolyte interposed between the anode side and the cathode side;
means for supplying the anode side with a safety gas;
means for exhausting a spent safety gas coming from the anode side supplied with the unspent safety gas; and
means for recirculating a specific percentage of the exhausted spent safety gas flow coming from the anode side of the fuel cells into the anode side of the fuel cells;
means for regulating the unspent gas flow to the fuel cell unit to achieve on the anode side a desired total amount of a reducing component contained in a combined safety gas flow of unspent and spent safety gases and/or a desired unspent safety gas flow rate; and
means for heating the safety gas flowing on the anode side by thermal energy contained in the gas flowing on the cathode side.

11. An arrangement as set forth in claim 10, wherein the specific percentage of the safety gas coming from the anode side of the fuel cell unit is within the range of 0-100%.

12. An arrangement as set forth in claim 11, comprising:
a fuel pretreatment device for uniting the recirculated spent safety gas flow with said unspent safety gas flow upstream or downstream the pretreatment device.

13. An arrangement as set forth in claim 12, comprising:
means for adjusting a temperature of a safety gas supplied to the solid oxide fuel cells for heating and/or cooling the fuel cell unit or an element associated therewith.

14. An arrangement as set forth in claim 10, comprising:
a fuel pretreatment device for uniting the recirculated spent safety gas flow with said unspent safety gas flow upstream or downstream the pretreatment device.

15. An arrangement as set forth in claim 10, comprising:
means for adjusting a temperature of a safety gas supplied to the solid oxide fuel cells for heating and/or cooling the fuel cell unit or an element associated therewith.

16. An arrangement as set forth in claim 11, wherein the specific percentage of the safety gas coming from the anode side of the fuel cell unit is more than 50%.

17. An arrangement as set forth in claim 11, wherein the specific percentage of the safety gas coming from the anode side of the fuel cell unit is more than 75%.

* * * * *